July 24, 1934.  A. LESAGE  1,967,415

MOTORCYCLE

Filed Nov. 4, 1932

Inventor

Alfred Lesage per

Dean Fairbank Hirsch & Foster
His Attorneys

Patented July 24, 1934

1,967,415

UNITED STATES PATENT OFFICE 1,967,415

MOTORCYCLE

Alfred Lesage, Schweinfurt, Germany

Application November 4, 1932, Serial No. 641,180
In Germany November 10, 1931

5 Claims. (Cl. 180—33)

The invention relates to motorcycles and more particularly to the method and means for adjustably mounting the motor in the cycle frame in such a manner that the motor is rockable about a lower fulcrum in the plane of the frame but with means whereby its upper part may be held rigid with respect to the frame.

The object of the invention is so to devise the adjusting means that they form, and operate as the appliance through which the definite position of the motor is rigidly secured, lateral rocking of the motor being prevented at the same time.

A further object of the invention is to mount the motor together with its auxiliary parts adjustably as a whole, a single device being sufficient to be operated with the aim to obtain the desired effect.

These objects are attained by means of a particular adjusting device arranged between the motor cylinder and the frame, the said device consisting of a link provided with a slanting or curved guide, and a fastening clip adapted to the respective frame tube and co-operating with the said guide. On the other hand lateral movement of the motor with respect to the frame is impeded through a forked guide provided upon the gear case of the motor and enclosing the saddle supporting frame tube.

A very accurate adjustment is rendered possible by the operation of an adjusting or tightening screw placed on the link having the oblique guide, the said screw acting on a projecting part of the clip.

On account of the special assembling of all auxiliary parts and supporting the exhaust pipe or silencer with its one end upon the motor cylinder and with its other end upon the hinge bolt or pivot of the motor, the entire aggregate will rock in unison when adjustment takes place.

An embodiment of the invention is represented by way of example in the accompanying drawing, which forms a part of this specification, and in which—

Like numerals denote like parts throughout all figures of the drawing.

Figure 1:
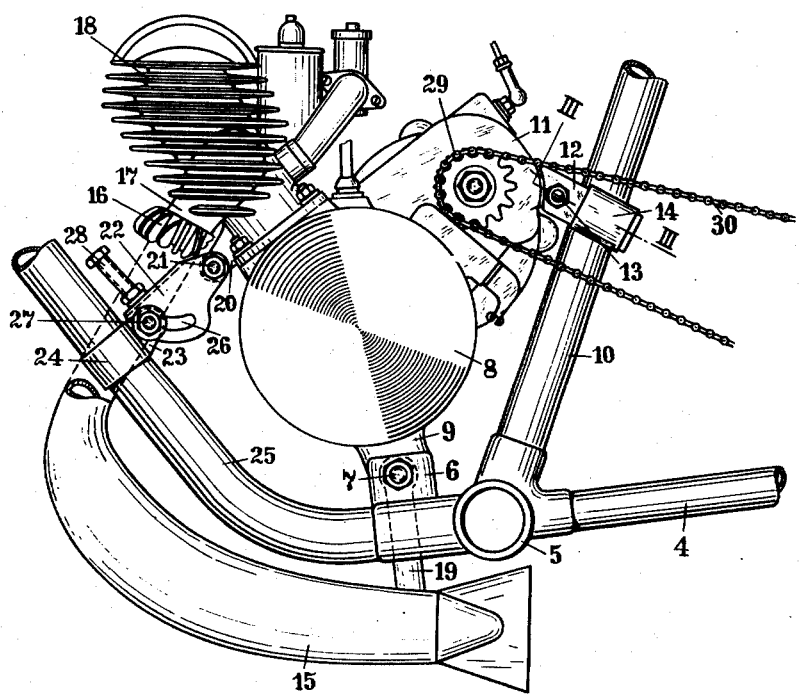
Fig. 1 is a partial lateral elevation of a cycle frame and the motor mounted therein with the main auxiliary appliances.

The frame of the motorcycle of which only a part is shown as broken off, i. e., the lower transverse tube 25, the saddle supporting post 10, a tube 4 of the lower rear fork, and the crank axle bearing bracket 5 interconnecting the said tube elements, is of the usual construction and has on the member 25 a connection clip 24 brazed or otherwise fixed to it while upon the tubular stud forwardly projecting from the crank axle bracket 5 and receiving the pipe 25, a flat lug 6 is provided forming a pivot support. The pedals, crank and crank bearing are not shown as they form no portion of this invention.

At its lowest point the crank case 8 of the motor an eye 9 is designed which is mounted swingably in the plane of the cycle frame by means of a bolt or fulcrum 7 on the lug or projection 6 extending upwards from the crank axle bracket 5.

Figure 3:
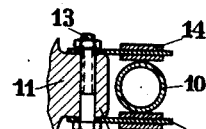
Fig. 3 is a cross section of the guide fork on the line III—III of Fig. 1.

From the top end of the gear case 11 of the motor extends backwards an eye 11' (see Fig. 3) to which two plates or straps 12 are rigidly connected by means of a bolt 13 in such a position that they form a fork structure and enclose the saddle frame tube 10 from both sides. These guiding straps 12 may be coated with a rubber layer 14, in order to prevent wearing or marring the tube 10, and may follow the motor when the same is being adjusted within the frame by being tilted about the bolt 7.

The muffler or silencer 15 of any known type and curved like a crescent is connected at its upper and fore end to the exhaust 17 of the cylinder 18 by means of a cap nut 16 the fins or ribs of which at the same time serve as cooling members. The upper part of the muffler is illustrated as broken away to show the parts disposed behind it. From the lower end of the muffler a strap 19 extends upwardly, and has an eye disposed at its free end which receives the fulcrum pin 7. The fulcra of the motor and of the muffler, respectively, therefore register with each other and both parts are carried together by the bolt 7. As the upper end of the muffler is attached to the motor it will rock in unison with the motor.

Figure 2:
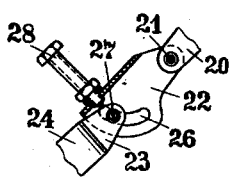
Fig. 2 is a sectional view of the adjusting link.

An adjusting member 22 (see Figs. 1 and 2) U-shaped in its cross section is pivotally mounted by a bolt 21 on an eye 20 with which the cylinder 18 is provided. With the free ends of its cheeks this member 22 encloses a projection 23 of the clip or bracket 24 fastened to the lower frame tube 25. A bolt 27 extends through curved slots 26 of the cheeks of the swingable member 22 and through a hole of the projection 23. Said slots 26 are designed eccentrically with respect to the pivot bolt 21. An adjusting set-screw 28 screwed through the web of the member 22 bears with its inner end against the projection 23 (see Fig. 2).

By screwing in the bolt 28, the slots 26 are moved along the bolt 27, and on account of the shape and the position of the said slots the distance is reduced between the bolts 21 and 27. The consequence thereof is that the motor 8, 11, 18 is moved forwards about the fulcrum pin 7 and the chain 30 running from the sprocket wheel 29 to the driving sprocket of the rear wheel is tightened. This adjusting device can be handled very easily as the only operation required is turning the screw 28.

It is not indispensable that the crank axle bracket 5 is provided with a projection 6 for receiving the bolt 7, it would be sufficient to arrange clips around the tubes 10 and 25 in order that the motor is swingably mounted. Moreover the motor-carrying design can also be adapted to cycle frames otherwise shaped.

What I claim, is—

1. In a motor-cycle of the kind described, an adjusting means capable of rocking the motor with respect to the cycle frame, comprising a link pivoted with one end to the motor and having lateral cheeks and oblique guide slots provided therein, an eye projecting from the adjacent frame tube between the said cheeks, a bolt passing through the oblique guide slots and said eye, and an operating screw disposed on the link and adapted to bear against the said eye.

2. In a motor-cycle, the combination with the frame of a motor having its lower end pivotally mounted in said frame, a fork projecting from the upper part of the motor and slidably receiving therein a portion of the frame at one side of said motor, a bolt rigidly connected with the frame at the opposite side of said motor, a link pivoted to said motor and having an oblique guide engaging said bolt, and means for adjusting said link with respect to said bolt to effect tilting of said motor about said pivotal support.

3. In a motor-cycle, the combination with a frame, of a motor having its lower part pivotally connected to said frame, a fork at the upper part of said motor upon one side thereof for engaging said frame, and slidable in respect thereto during the pivotal movement of said motor, means at the upper part of the motor and on the side opposite to said fork for swinging said motor and locking it in adjusted position, a silencer connected to the exhaust of said motor and rigid in respect thereto and movable with said motor during the swinging movement of the latter, and means pivotally connected to said frame and movable about the axis of the pivotal support of the motor for supporting said silencer adjacent to the free end of the latter.

4. In a motor-cycle, the combination with a frame having upwardly extending oppositely inclined frame members, of a motor, a pivot bolt connecting the lower portion of said motor and the lower portion of said frame, whereby the upper end of the motor may move in the plane of the frame, a guide at one side of said motor and engaging one of said frame members for preventing lateral movement of the motor during rocking movement about said pivot bolt, and an adjusting device on the other side of said motor and engaging the other one of said frame members, and operable to positively move the motor about said pivot bolt and to hold it in adjusted position.

5. In a motor-cycle of the kind described, the combination with a motor fulcrumed at its lower end to the cycle-frame, of a rockable link attached to the motor by a pivot and having lateral cheeks with guide slots disposed eccentrically with respect to the pivot, an eye projecting from the adjacent frame tube and engaging said link, a bolt fixed in said eye and passing through said guide slots, and means for adjusting the link with respect to said bolt.

ALFRED LESAGE.